Jan. 8, 1957 W. J. BROWN 2,777,106
ELECTRIC CONTROL SYSTEM FOR ADJUSTING AND
CONTROLLING SPEED OF A SERIES MOTOR
Filed May 1, 1953 4 Sheets-Sheet 1

WALTER J. BROWN
INVENTOR

BY James B. Grant
ATTORNEY

Jan. 8, 1957    W. J. BROWN    2,777,106
ELECTRIC CONTROL SYSTEM FOR ADJUSTING AND
CONTROLLING SPEED OF A SERIES MOTOR
Filed May 1, 1953    4 Sheets-Sheet 3

WALTER J. BROWN
INVENTOR

BY  *James B. Grant*
ATTORNEY

INVENTOR.
WALTER J BROWN
BY James B. Grant
ATTORNEY

United States Patent Office 2,777,106
Patented Jan. 8, 1957

2,777,106

ELECTRIC CONTROL SYSTEM FOR ADJUSTING AND CONTROLLING SPEED OF A SERIES MOTOR

Walter J. Brown, Stamford, Conn.

Application May 1, 1953, Serial No. 352,428

14 Claims. (Cl. 318—249)

This invention relates in general to electric drives including electrical control systems for adjusting and/or controllable electric converter, and more particularly to such systems in which the converter comprises one or more space discharge devices or rotating electrical machines having an output which is controllable by means of a relatively small signal voltage applied to control terminals of the converter.

One object of the invention is to provide a simple control system which permits the use of a single converter for supplying both the armature and field of the motor.

Another object of the invention is to provide a wide range of control of both the armature and field voltages and thus enable the motor speed to be adjusted over a wide range.

Another object of the invention is to provide such a system which enables the speed of the motor to be controlled so as to remain substantially constant at a selected value irrespective of fluctuations in the load on the motor.

Another object of the invention is to control the output of the converter by a quantity which is dependent on the ratio between the voltage across the armature winding and the voltage across the field winding, thus tending to maintain constant speed irrespective of load changes.

Another object of the invention is to control the output of the converter by a quantity which is dependent on the ratio between the armature voltage and a nonrectilinear (hereinafter referred to as "non-linear") function of the field voltage, thus tending to maintain constant speed in spite of magnetic saturation in the motor.

Another object of the invention is to improve the stability of the system by reducing the effect of transient field voltages.

The parent application, Serial Number 222,378, filed April 23, 1951, now Patent No. 2,733,395, of which this application is a continuation-in-part, describes systems for adjusting or controlling a series wound electric motor supplied from a controllable converter, in which the output of the converter is controlled by a quantity dependent upon the relation between the voltage across the motor armature and the voltage across a motor series field winding. Arrangements are also described, with reference to Fig. 7, for deriving a feedback voltage ($E_x$) which is approximately proportional to the motor field flux, by means of two serially connected resistive elements having different voltage coefficients of resistance. By suitable adjustment this will compensate for the non-linear relation of field flux to field voltage which is caused by magnetic saturation, and thus maintain substantially constant motor speed regardless of load (under steady state conditions). It is explained therein that the system may be unstable when the motor has a highly inductive field winding, due to the fact that a sudden change in motor current will induce a transient voltage across the field winding (5) and will temporarily disturb the ratio of field voltage of armature voltage. It is also explained that "in such instances it has been found that the stability may be improved by connecting a resistor 263 in parallel with the field winding 5 and, accordingly, this is shown in Fig. 7 by an optional connection from the lug 264 to the terminal screw 265."

Alternative methods will now be described for improving the stability of the system in one or more of the following ways:

(1) By introducing a time constant into the potential divider 10 of Fig. 1 and other Figures.

(2) By including resistive elements having different voltage coefficients, in the potential divider circuit 10 rather than in connection with the field 5.

(3) By deriving from the field voltage a feedback voltage which is dependent on the field voltage, and which is compensated with regard to the time constant of the field winding.

Figure 1:
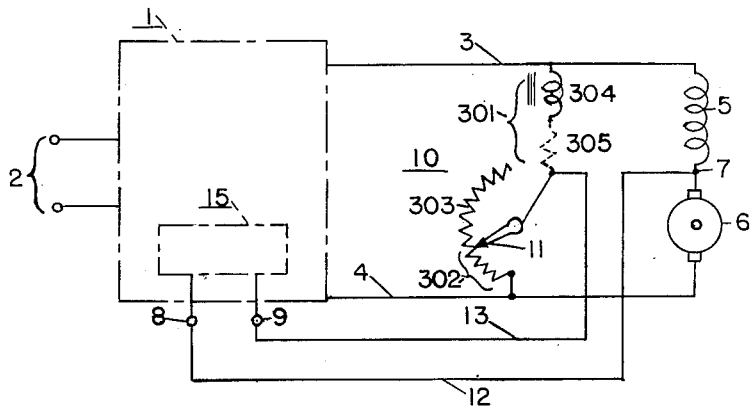
Figure 1 illustrates in schematic form an arrangement in which a time constant is introduced into the potential divider.
Figure 3:
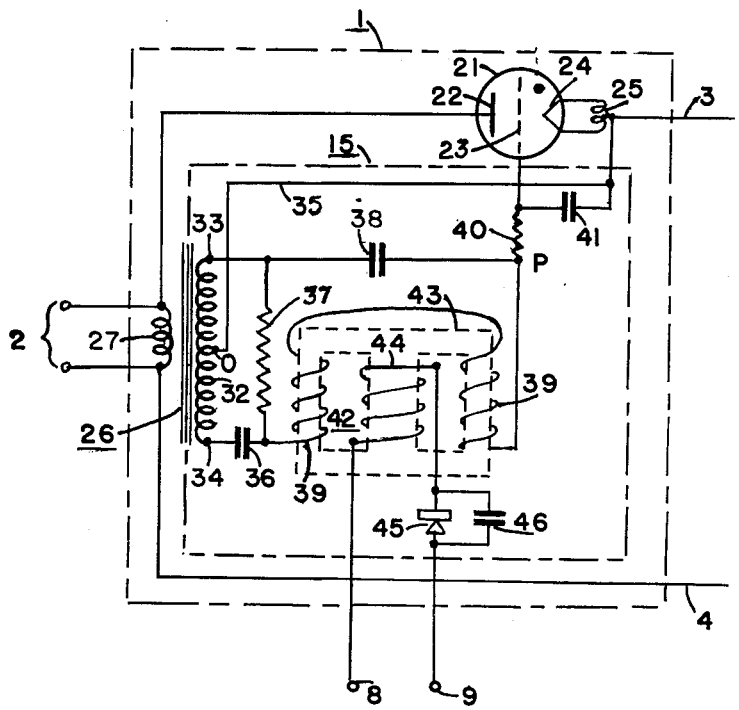
Fig. 3 illustrates a practical electric power converter and control device useable in the invention described.

In Figure 1, a controllable electric power converter 1 which may be similar to that shown in Fig. 3 is arranged to derive its input power from alternating current input terminals 2 and to deliver its output power through conductors 3 and 4 to a series wound electric motor having a field winding 5 connected in series with an armature 6 through a common point 7. The converter 1 is also provided with control terminals 8 and 9 connected to a sensitive control device 15 whereby the output of the converter may be controlled by the application of a relatively small voltage across said terminals. A potential divider 10 is connected between the output terminals of the converter and is provided with a tapping point 11 which is preferably adjustable. The common point 7 and the tapping point 11 are connected by conductors 12 and 13 respectively to the control terminals 8 and 9. The potential divider 10 comprises a fixed inductive portion 301 which is connected between conductor 3 and tapping point 11, and a variable resistive portion 302 which comprises the lower end of rheostat winding 303 between the tapping point 11 and the conductor 4. The fixed inductive portion 301 comprises an inductive element 304 and a resistive element 305 which is shown in dotted lines since it may consist wholly or in part of the inherent resistance of an inductive reactor which may form the whole of the "inductive portion" 301, and will be so referred to hereunder.

In many commercial series-wound motors, the ratio of inductance-to-resistance $$\left(\frac{L}{R}\right)$$

of the field winding or windings is considerably greater than the $L/R$ ratio of the armature winding; accordingly, if a sudden change of voltage is applied to the motor, through conductors 3 and 4, there will be some time delay before the corresponding change of voltage is developed across the armature 6, and this time delay will be referred to as the "time constant" of the motor. In the arrangement of Fig. 1, a time constant is introduced into the potential divider 10 by means of the inductive reactor 301, so that there will also be a delay before the appropriate change of voltage appears across the variable resistive portion 302 of said potential divider. The value of the inductance 304 may be chosen in relation to the resistance of rheostat 303, so that the time constant of potential divider 10 is of the same order of magnitude as the time constant of the motor, when the tapping point 11 is adjusted to a position where the greatest instability would otherwise be experienced. Under these conditions, when a sudden change of voltage is applied between conductors 3 and 4, the potentials at common point 7 and tapping point 11 change at approximately the same rate, and accordingly the difference of these potentials, which is applied to control terminals 8 and 9, does not suffer from severe transient changes which could occur, for instance, if the motor had a very long time constant, and if the potential divider consisted only of resistors having a very short time constant.

Figure 2:
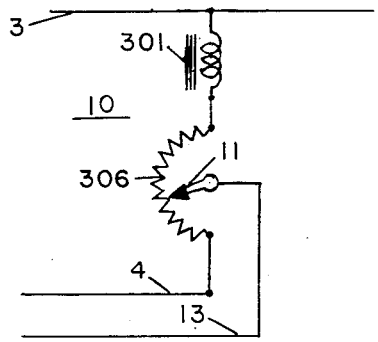
Figure 2 illustrates an alternative connection for a part of the circuit of Figure 1.

If desired, the potential divider 10 may be arranged to have a substantially unchanged time constant, regardless of the position of the tapping point 11, by connecting the potential divider as shown in Fig. 2. In this arrangement a potentiometer 306 is connected in series with the inductive reactor 301 between conductors 3 and 4, and the tapping point 11 is connected to conductor 13. Since the total resistance of the potentiometer 306 is always connected in series with the inductive reactor 301, the time constant is unchanged when the tapping point 11 is moved, and this time constant may be selected to be similar to the time constant of the motor, so as to reduce or eliminate transient signal voltages and give stable motor performance over a considerable range of speeds.

Figure 5:
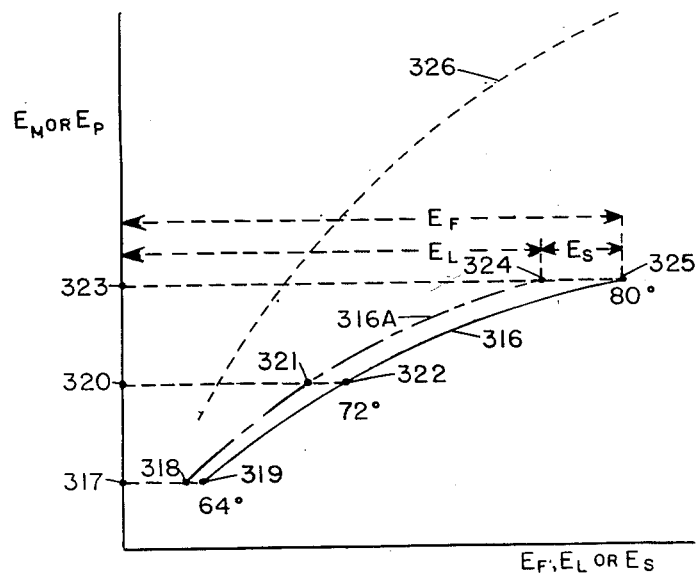
Figure 5 illustrates the principle of operation of Figure 4.

In Fig. 3 converter 1 comprises the single vapor or gas-filled rectifier tube 21 having an anode 22, a control grid 23 and a cathode 24 which may be heated by the secondary winding 25 of transformer 26, the primary winding 27 of which is connected to A. C. input terminals 2. The output of the converter is delivered thru conductor 3 from the cathode of rectifier tube 21 and thru conductor 4 connected to the opposite end of primary winding 27 of the transformer. The control device 15 comprises a phase shifter similar to that described in Fig. 5 of U. S. Patent 2,524,762 granted to the applicant and it operates in accordance with the vector diagram shown in Fig. 2 of said patent. The secondary winding 32 of transformer 26 forms a first branch circuit having end terminals 33 and 34 and an intermediate terminal O which forms a first output terminal of the phase shifter and is connected through conductor 35 to the center tap of the cathode transformer winding 25. A second branch circuit includes a capacitor 36 and a resistor 37. A capacitor 38 and a variable inductive element 39 are serially connected across the resistor 37 with a second output terminal "P" in the series connection between them. Said output terminal "P" is connected thru a filter resistor 40 to the grid 23, and a small capacitor 41 is connected from grid 23 to cathode winding 25 for the purpose of filtering out any high frequency transients. The variable inductive element 39 is formed by the series-connected A. C. windings of a saturable reactor 42, said windings being located on the two outer legs of a 3 legged magnetic core 43 which is shown in dotted lines. A control winding 44 is located on the center leg and is connected to the control terminals 8 and 9. A small dry disc rectifier 45 is interposed in series between control terminal 8 and control winding 44 and is preferably shunted by a capacitor 46. This power converter and its control device are practically operative in the invention herein disclosed although a mercury arc rectifier or motor generator operating as a sensitive dynamoelectric amplifier may be substituted for the above circuit, as shown in Figs. 5 and 9 of my co-pending application Serial No. 222,378, filed on April 23, 1951. The phase shifter or control device 15 delivers an A. C. voltage to the converter grid 23 the phase angle of which may be varied as shown in the vector diagram, Fig. 2 of U. S. Patent 2,524,762 with its accompanying description. When no signal voltage is applied to control terminals 8 and 9, the impedance of the A. C. winding 39 is a maximum and the phase angle of the output voltage OP is retarded as far as possible in relation to the cathode-to-anode voltage applied to the tube 21 and accordingly the converter output is a minimum. The exact value of this minimum output is important, since it acts as priming voltage to insure energization of the control system when required, and it may be adjusted as follows. A coarse adjustment can be made by altering the value of capacitor 38, an increased value retarding the phase and reducing the output; a fine adjustment can be made by altering the value of resistor 40 or capacitor 41, an increased value of either one slightly retarding the phase and reducing the output.

When an asymmetric or D. C. signal voltage of the appropriate polarity is applied to control terminals 8 and 9, the core 43 tends to saturate, the impedance of the A. C. windings 39 is reduced, and the phase angle of the grid voltage OP is advanced, as may be seen from the vector diagram, thus increasing the output of the converter 1. The purpose of the rectifier 45 is to insure that the converter output is only increased when the potential at terminal 9 becomes more positive in relation to the potential at terminal 8 and that the converter output remains very low if for instance the potential at terminal 9 is suddenly decreased to a potential which is more negative than that at terminal 8; the rectifier 45 prevents loss of control which might otherwise occur under such condition. The use of a rectifier for this purpose is described in U. S. Patents 2,697,194 and 2,697,197. A capacitor 46 is preferably connected across the rectifier 45 in order to reduce the A. C. ripple which is developed across the rectifier and which is thereby rectified to produce spurious D. C. components of control signal voltage.

Figure 4:
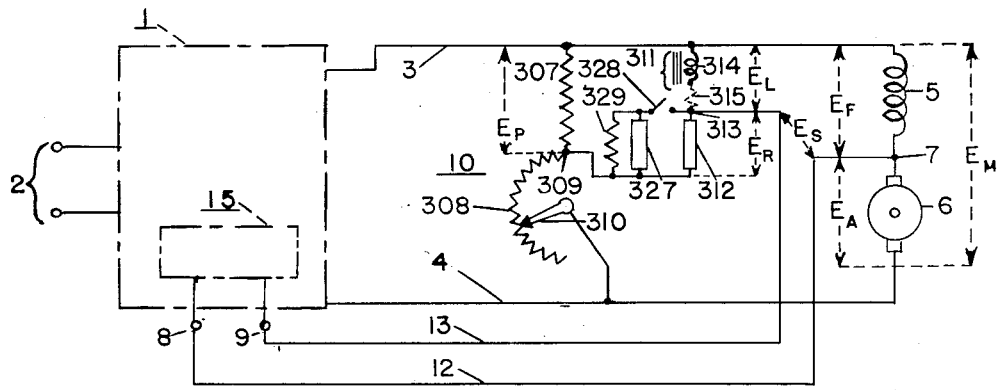
Figure 4 illustrates a modification of Figure 1 in which resistive elements having different voltage coefficients are also introduced into the potential divider.

Fig. 4 illustrates an arrangement in which many of the parts are similar to those of Fig. 1, and those parts have been similarly numbered and their description will not be repeated. However, in Fig. 4 the potential divider 10 comprises a fixed resistor 307 and a rheostat 308 which are serially connected between conductors 3 and 4 through a junction point 309, the rheostat being provided with an adjustable slider 310 which is connected to conductor 4. An inductive reactor 311 is connected in series with a resistive element 312 between conductor 3 and junction point 309, including the tapping point 313; the inductive reactor 311 consists of an element of inductance 314 and element of resistance 315 which is shown in dotted lines as it may constitute at least in part the inherent resistance of the inductive reactor 311. The resistive element 312 has a high negative voltage coefficient of resistance (in other words it is "non-linear"), so that its ohmic resistance is reduced as the voltage across it increases. The arrangement shown in Fig. 4 compensates for the non-linear variation in the relation between motor field flux and the voltage across the field winding, due to magnetic saturation, in a manner which is generally similar to that which is now described in detail with reference to Fig. 5.

In Fig. 5 the solid line graph 316 shows the relation between the field voltage $E_F$ and the total motor voltage $E_M$ when the motor is operated at a constant speed which is equal to the minimum speed which is desired when the rheostat 308 is adjusted to zero resistance; the phase angles of the grid firing peaks which are required to operate the motor at this particular speed under three conditions and load are indicated by the figures 64°, 72°, and 80° at the points 319, 322 and 325 on the graph 316. Since the rheostat 308 is adjusted to zero resistance, the total motor voltage $E_M$ is equal to the voltage $E_P$ across the resistor 307 of the potential divider 10, as will be seen from Fig. 4. The chain-dotted graph 316A shows the relationship between the voltage $E_L$ which is tapped across the inductive reactor 311, and the total voltage $E_P$ which appears across the series circuit comprising reactor 311 and non-linear resistive element 312. The horizontal dotted lines 317—318—319, 320—321—322, and 323—324—325 are drawn through the points on graph 316 which correspond to the equal increments between phase angles 64°, 72°, and 80°. The lengths 317—318, 320—321, and 323—324 represent the voltages across the reactor 311 for these three conditions of load and phase angle. The lengths 318—319, 321—322, and 324—325 represent the signal voltages $E_S$ which are equal to the differences between the voltages $E_F$ and $E_L$ as will be seen from Fig. 4; the graph 316A should be drawn so that these three signal voltages increase in approximately equal steps, corresponding to the signal voltages required to produce equal increments of phase angle. The non-linear resistive element 312 should then be chosen in relation to the total resistance 315 of the inductive reactor 311, so as to develop the required curvilinear characteristic shown by graph 316A in Fig. 5, in order that the motor should always be supplied with total voltage $E_M$ and field voltage $E_F$ in accordance with the graph 316, thus causing the motor to run at constant speed.

If the rheostat 308 is now adjusted to have a resistance which is for instance equal in value to the effective resistance of resistor 307 when shunted by the serially connected elements 311 and 312, the total motor voltage $E_M$ will then be equal to twice the voltage $E_P$, and accordingly the motor will run at a considerably higher speed, corresponding to the new graph 326 in which all the values of $E_M$ are double those of the graph 316, for corresponding values of $E_F$; by increasing the resistance of rheostat 308 still further, the motor may be operated at still higher speeds as desired. In order to maintain a substantially constant ratio of $E_P$ to $E_M$ when the ohmic value of resistive element 312 varies with load, it is desirable that resistor 307 should have a low ohmic value in relation to that of the circuit comprising the serially connected components 311 and 312. Furthermore it has been found that in some designs of motor the "constant speed" graphs such as 316 have a different curvature at very low speeds, and they require a different amount of non-linear compensation. Accordingly, Fig. 4 shows an additional non-linear resistive element 327 which may be switched in parallel with element 312 by means of switch 328; this simultaneously reduces the ratio of armature-to-field voltage so as to lower the minimum speed, and it also alters the amount of curvilinear compensation which is introduced at these very low speeds. If desired, the non-linear resistive element 327 may be shunted by a linear resistor 329 which has the desirable effect of reducing the rise in speed which sometimes occurs when the load is entirely removed from the motor.

Figure 6:
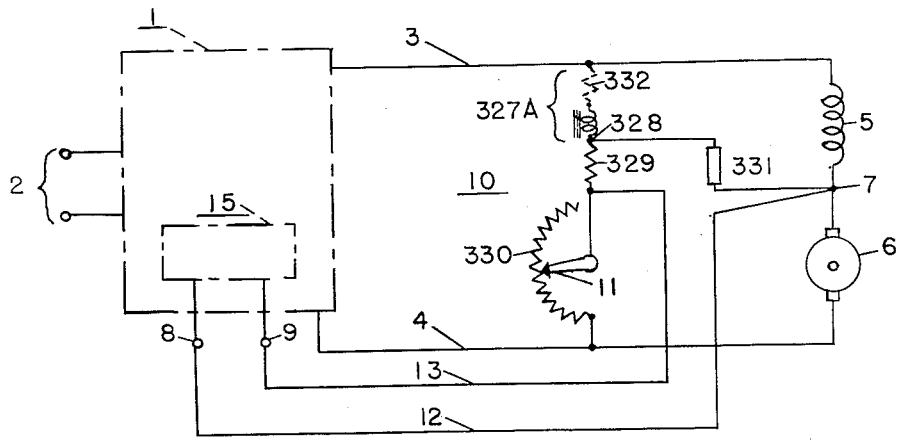
Figure 6 illustrates in schematic form an arrangement in which compensation is provided for the time constant of the field voltage.

The arrangement shown in Fig. 6 also has many parts which are common to those of Fig. 1 and which are therefore similarly numbered, and their description will not be repeated. In Fig. 6, however, the potential divider 10 which is connected between conductors 3 and 4 comprises an inductive reactor 327A having a resistance component 332 which resistance may be at least partly inherent, connected through a junction point 328 to a fixed resistor 329 and thence through the tapping point 11 to the rheostat 330; a resistive element 331 is connected between the junction point 328 and the common point 7 of the field 5 and armature 6. The effect of the inductive reactor 327A and resistive element 331 is to reduce the effect of transient voltages which may be applied between conductors 3 and 4 upon the voltages in the lower portion of potential divider 10 across resistor 329 and rheostat 330; it is desirable to proportion the reactor 327A and resistive element 331 so that the time constant which is thus introduced into the potential divider 10 is of the same order of magnitude as the time constant of the series circuit comprising the motor field 5 and armature 6; in this way stable operation of the motor can be obtained over a wide range of speeds.

The circuit of Fig. 6 can also be arranged to compensate for the non-linearity of field flux in relation to field voltage, by selecting a resistive element 331 which has a high negative voltage coefficient of resistance which then cooperates with the resistive component 332 of the reactor 327A in the following way. If the total motor voltage between conductors 3 and 4 is steadily increased, the voltage across the resistive element 331 will increase less rapidly than the voltage across the motor field winding 5, owing to the negative voltage coefficient of resistive element 331; assuming that the control device 15 is very sensitive so that a negligibly small signal voltage is required between conductors 12 and 13 and therefore between common point 7 and tapping point 11, it will be seen from Fig. 6 that the voltage across resistor 329 in the potential divider is substantially equal to the voltage across resistive element 331, and accordingly the voltage across resistor 329 will also increase less rapidly than the motor field voltage, under these conditions. The current flowing in the rheostat 330 is substantially equal to the current flowing in resistor 329, since the signal current in conductor 13 has been assumed to be negligible, and accordingly the voltage across rheostat 330 will also increase less rapidly than the voltage across the motor field winding 5. Referring to Fig. 6 it will be seen that the voltage across the motor armature 6 is almost identical with the voltage across rheostat 330, since it is assumed that only a negligible signal voltage exists between tapping point 11 and common point 7; accordingly, the voltage across the armature 6 will also increase less rapidly than the voltage across field 5, when the total motor voltage is steadily increased; the voltage coefficient and resistance value of resistive element 331 may be selected in relation to resistance component 332 so that the motor field voltage increases with total motor voltage according to a curve such as graph 316 of Fig. 5, and under these conditions the motor will run at a constant speed regardless of the load which is applied to it.

It will be noted that in both Fig. 4 and Fig. 6 the resistive elements of high negative voltage coefficient 312, 327 and 331 are connected in series with an inductive reactor 311 or 327A; the inductive reactor has the very desirable effect of filtering out the peaky ripple voltages which would otherwise be applied to the negative voltage coefficient elements and which might give spurious results due to the heavy currents which would flow during the voltage peaks; by so filtering the voltage, the current through the resistive elements of negative voltage coefficient, and therefore the voltage drop across said elements is made more nearly representative of the average or mean value of the voltage which is applied to said element and reactor in series.

Figure 7:
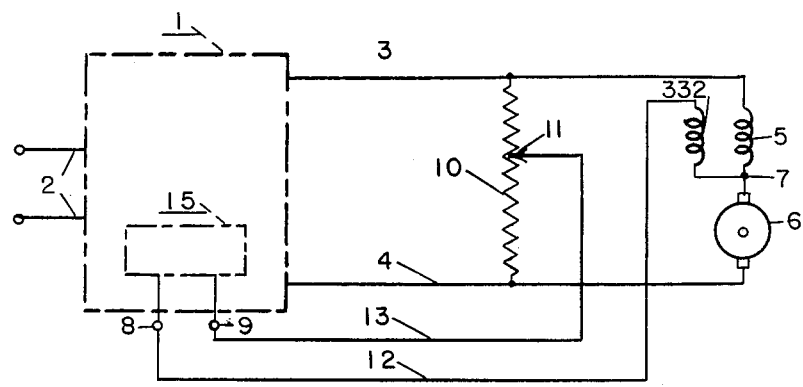
Figure 7 illustrates an alternative arrangement for compensating the time constant in the field voltage.

Fig. 7 illustrates an alternative arrangement for deriving from the field voltage a feedback voltage which is dependent upon the field voltage, and which is compensated with regard to the time constant of the field winding so as to reduce the disturbing effect of transients. Many of the parts are again numbered similarly to those of Fig. 1, and their description will not be repeated.

Figure 8:
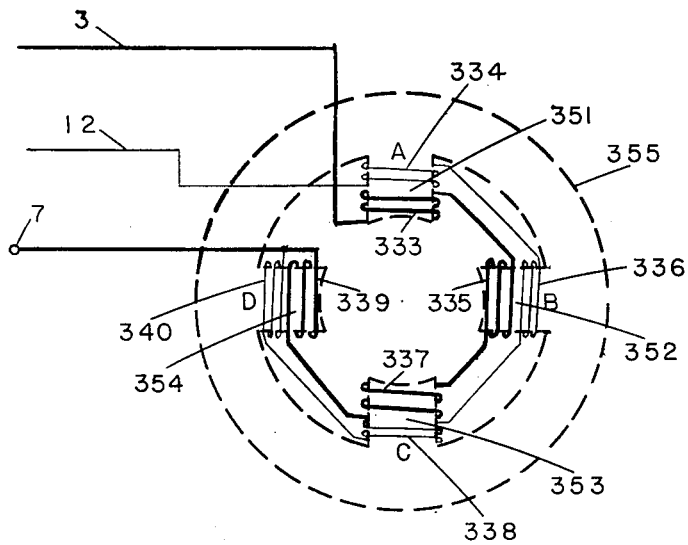
Figure 8 illustrates a part of Figure 7 in more detail.

In Fig. 7, however, the conductor 12 is connected to the common point 7 through an auxiliary field winding 332. Said auxiliary field winding is wound on the same field poles or field structure as the main field winding 5 and it has approximately the same number of turns as the main field winding 5 but is of much thinner wire as it does not have to carry appreciable current; the direction of rotation of said auxiliary winding 332 is similar to that of winding 5, when both windings are considered as starting from the common point 7. Although the field winding 5 and auxiliary winding 332 are shown in Fig. 7 each as a single element, it will be appreciated that in the construction of a practical motor, each of said windings comprises a number of coils corresponding to the number of poles in a salient-pole motor, or to the number of slots in the field structure of a distributed field motor. Fig. 8 shows the detailed connections in the case of a motor having four salient magnetic poles, 351, 352, 353 and 354 mounted inside a magnetic yoke 355. Coils 333 and 334 are wound on pole 351; coils 335 and 336 are wound on pole 352; coils 337 and 338 are wound on pole 353; coils 339 and 340 are wound on pole 354. Coils 333, 335, 337 and 339 are serially connected to form the main field winding 5; coils 334, 336, 338 and 340 are serially connected to form the auxiliary field winding 332.

Reverting to Fig. 7, the effect of the auxiliary winding 332 is to induce into the signal circuit traced through 7, 332, 12, 8, 15, 9, 13 and 11, during conditions of rapid or transient voltage change across field winding 5, a voltage equal and opposite to the transient component of said voltage.

In this way, the feedback voltage between conductors 12 and 13 is dependent primarily on the steady-state value of the field voltage, and is dependent only to a lesser extent on the transient value of said field voltage, thus providing more stable operation.

What is claimed is:

1. A control system for a series wound electric motor having an armature and at least one field winding, comprising: a controllable electric power converter having at least first and second control terminals and having at least two output terminals; a series motor circuit including said armature and field windings connected in series between said two output terminals; means for deriving a potential representative of the field voltage comprising an electric connection from a point on said series motor circuit to one of said control terminals; a voltage measuring circuit connected in parallel with said series motor circuit and including a tapping point; reactance means for compensating the effect of transient voltages in the field winding; and an electrical connection from said tapping point to the other of said control terminals, so that the potential at said tapping point is balanced against the potential representative of the field voltage to establish a potential difference which is applied between said control terminals.

2. A control system in accordance with claim 1 in which said voltage measuring circuit comprises a resistance and in which said electric connection from a point on said series motor circuit to one of said control terminals includes at least one inductance electrically coupled to at least part of said field winding for compensating the effect of transient voltages.

3. A control system in accordance with claim 1 in which said voltage measuring circuit includes at least one resistance and inductance for compensating the effect of transient voltages.

4. A control system in accordance with claim 1 in which said voltage measuring circuit includes a resistance and inductance and in which the voltage measuring circuit includes resistive elements having different voltage coefficients.

5. A control system in accordance with claim 1 in which said voltage measuring circuit includes at least one resistance and inductance and in which a resistance of different voltage coefficient is connected between said point on said series motor circuit and a point on said voltage measuring circuit.

6. A control system for a series wound electric motor having an armature and at least one field winding comprising: a controllable electric power converter having at least two control terminals and at least two output terminals; a series motor circuit including said armature and field windings connected in series between said two output terminals; an electrical connection between a point on said series motor circuit and one of said control terminals; a voltage measuring circuit, comprising an inductance and resistance, in parallel with said motor circuit and including a tapping point; and an electrical connection between said tapping point and the other of said control terminals.

7. A control system in accordance with claim 6 in which said voltage measuring circuit comprises an inductance and a resistance at least part of which has a different voltage coefficient from the remaining part of said resistance.

8. A control system in accordance with claim 6 including a resistance of different voltage coefficient between said point on the series motor circuit and a point on said voltage measuring circuit.

9. A control system for a series wound electric motor comprising: a controllable electric power converter having at least two output terminals and at least two control terminals; a resistance across said two output terminals; a tapping from said resistance to one control terminal; and at least one separate winding coupled to at least one motor field winding and connected between a point on the motor circuit and a second control terminal.

10. A variable speed electric drive comprising: a controllable electric power converter having two control terminals and a first and a second output terminal; an electric motor having an armature and at least one field winding serially connected respectively between said first output terminal, a common point and said second output terminal; a voltage measuring circuit comprising: a first portion connected between said first output terminal and a tapping point, and a second portion connected between said tapping point and said second output terminal; a control circuit comprising connections from said tapping point to one of said control terminals and connections from the other of said control terminals to said common point; and an inductive winding being included in the closed loop comprising said field winding, said control circuit and said second portion, so arranged as to reduce the effect of transient voltages across said field winding on the current in said control circuit.

11. A control system for a series wound electric motor having an armature and at least one field winding serially connected respectively between an armature terminal, a common point, and a field terminal; a controllable electric power converter having at least two control terminals and at least a first output terminal connected to said armature terminal and a second output terminal connected to said field terminal; a voltage measuring circuit comprising a first portion connected between said armature terminal and a tapping point, and a second portion connected between said tapping point and said field terminal; a control circuit comprising connections from said tapping point to one control terminal and from the other control terminal to said common point and forming a closed loop together with said second portion and said field winding; including an inductive winding serially connected in said closed loop and so arranged as to reduce the effect of transient voltages across said field winding upon the current in said control circuit.

12. A control system, for an electric power converter having two control terminals and having first and second output terminals for connection to the armature and field windings respectively of a series wound electric motor having a common point therebetween, comprising: a voltage measuring circuit connected across said output terminals and comprising two portions at least one of which is reactive and having a tapping point between said portions; a connection from said tapping point to one control terminal; and another connection from the other control terminal to said common point.

13. The combination of claim 12, in which the voltage measuring circuit includes resistive elements having different voltage coefficients of resistance.

14. The combination of claim 12, in which a resistive element having a negative voltage coefficient of resistance is connected between said common point and an intermediate point on one of said portions of the voltage measuring circuit.

References Cited in the file of this patent

UNITED STATES PATENTS

| | | |
|---|---|---|
| 2,552,206 | Moyer | May 8, 1951 |

FOREIGN PATENTS

| | | |
|---|---|---|
| 580,005 | Great Britain | Aug. 13, 1946 |